(12) United States Patent
Cheaz et al.

(10) Patent No.: US 10,899,344 B2
(45) Date of Patent: Jan. 26, 2021

(54) VEHICULAR ACCIDENT PREVENTION

(71) Applicant: INTERNATIONAL BUSINESS MACHINES CORPORATION, Armonk, NY (US)

(72) Inventors: Nixon Cheaz, Cary, NC (US); Anthony Diaz, Cary, NC (US); Michael E. Head, Cary, NC (US); Jordana H. Kerr, Raleigh, NC (US); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 15/865,488

(22) Filed: Jan. 9, 2018

(65) Prior Publication Data
US 2019/0210595 A1 Jul. 11, 2019

(51) Int. Cl.
*B60W 30/09* (2012.01)
*B60W 30/095* (2012.01)
*B60W 30/18* (2012.01)

(52) U.S. Cl.
CPC .......... *B60W 30/09* (2013.01); *B60W 30/095* (2013.01); *B60W 30/18109* (2013.01); *B60W 2552/00* (2020.02); *B60W 2554/00* (2020.02)

(58) Field of Classification Search
CPC ............... B60W 30/09; B60W 30/095; B60W 30/18109; B60W 2552/00; B60W 2554/00
See application file for complete search history.

(56) References Cited

U.S. PATENT DOCUMENTS

| 2,300,725 | A | * | 11/1942 | Cieri | B60T 1/14 188/5 |
| 3,605,954 | A | * | 9/1971 | Wakabayashi et al. | B60T 1/14 188/4 R |
| 3,953,051 | A | * | 4/1976 | Weathers | B60T 1/14 280/763.1 |
| 3,994,369 | A | * | 11/1976 | Powaska | B60T 1/14 188/5 |
| 4,265,338 | A | * | 5/1981 | Shea | B60T 1/14 188/4 R |
| 4,317,507 | A | * | 3/1982 | McMillan | B60T 1/14 188/2 R |
| 4,896,749 | A | * | 1/1990 | Walker | B60B 39/00 180/164 |

(Continued)

FOREIGN PATENT DOCUMENTS

EP 3156298 4/2017

*Primary Examiner* — Aaron L Troost
(74) *Attorney, Agent, or Firm* — Schmeiser, Olsen & Watts; Nicholas L. Cadmus

(57) ABSTRACT

A method and system enabling a process for preventing a vehicular accident is provided. The method includes continuously monitoring vehicular impact conditions associated with a vehicle in motion. In response, an imminent impact event associated with the vehicle in motion and an external object is detected and a surface of a roadway below the vehicle in motion is scanned by sensors of the vehicle. Results of the scanning indicate that the roadway surface is safe for deployment of a destructive friction based braking mechanism of the vehicle. The destructive friction based braking mechanism is deployed with respect to a first braking force threshold and it is determined if rate of speed decrease exceeds a specified speed decrease threshold.

19 Claims, 4 Drawing Sheets

(56) References Cited

U.S. PATENT DOCUMENTS

| | | | | |
|---|---|---|---|---|
| 5,439,076 A * | 8/1995 | Percy, Jr. | ............... | B60T 1/14 |
| | | | | 188/4 R |
| 5,752,587 A * | 5/1998 | Darling | ................ | B60T 1/14 |
| | | | | 180/9.46 |
| 6,158,556 A * | 12/2000 | Swierczewski | ......... | B60T 1/14 |
| | | | | 188/5 |
| 6,447,009 B1 * | 9/2002 | McMillan | ............... | B60T 1/14 |
| | | | | 188/4 R |
| 8,827,047 B2 | 9/2014 | Baker et al. | | |
| 9,656,638 B2 * | 5/2017 | Rydsmo | ................ | B60T 1/14 |
| 10,112,566 B2 | 10/2018 | Kodama et al. | | |
| 10,220,818 B1 * | 3/2019 | Miller | ................... | B60T 7/22 |
| 2004/0011606 A1 * | 1/2004 | Lee | ....................... | B60T 1/14 |
| | | | | 188/200 |
| 2008/0082244 A1 * | 4/2008 | Watanabe | ............. | B60T 1/14 |
| | | | | 701/71 |
| 2011/0155496 A1 * | 6/2011 | Baumann | ......... | B60R 21/0134 |
| | | | | 180/282 |
| 2011/0198161 A1 * | 8/2011 | Lomazzo | ............ | B60T 1/14 |
| | | | | 188/5 |
| 2013/0037355 A1 * | 2/2013 | Baker | ................. | B60T 1/14 |
| | | | | 188/5 |
| 2015/0210256 A1 | 7/2015 | Yamashita et al. | | |
| 2017/0015287 A1 * | 1/2017 | Sander | ................ | B60T 13/46 |
| 2017/0101095 A1 * | 4/2017 | Nilsson | ................ | B60T 1/14 |
| 2017/0166172 A1 | 6/2017 | Kwon et al. | | |
| 2019/0039584 A1 * | 2/2019 | Reed | ................... | B60B 39/02 |
| 2019/0263365 A1 * | 8/2019 | Krasnoff | ............... | B60T 1/14 |

* cited by examiner

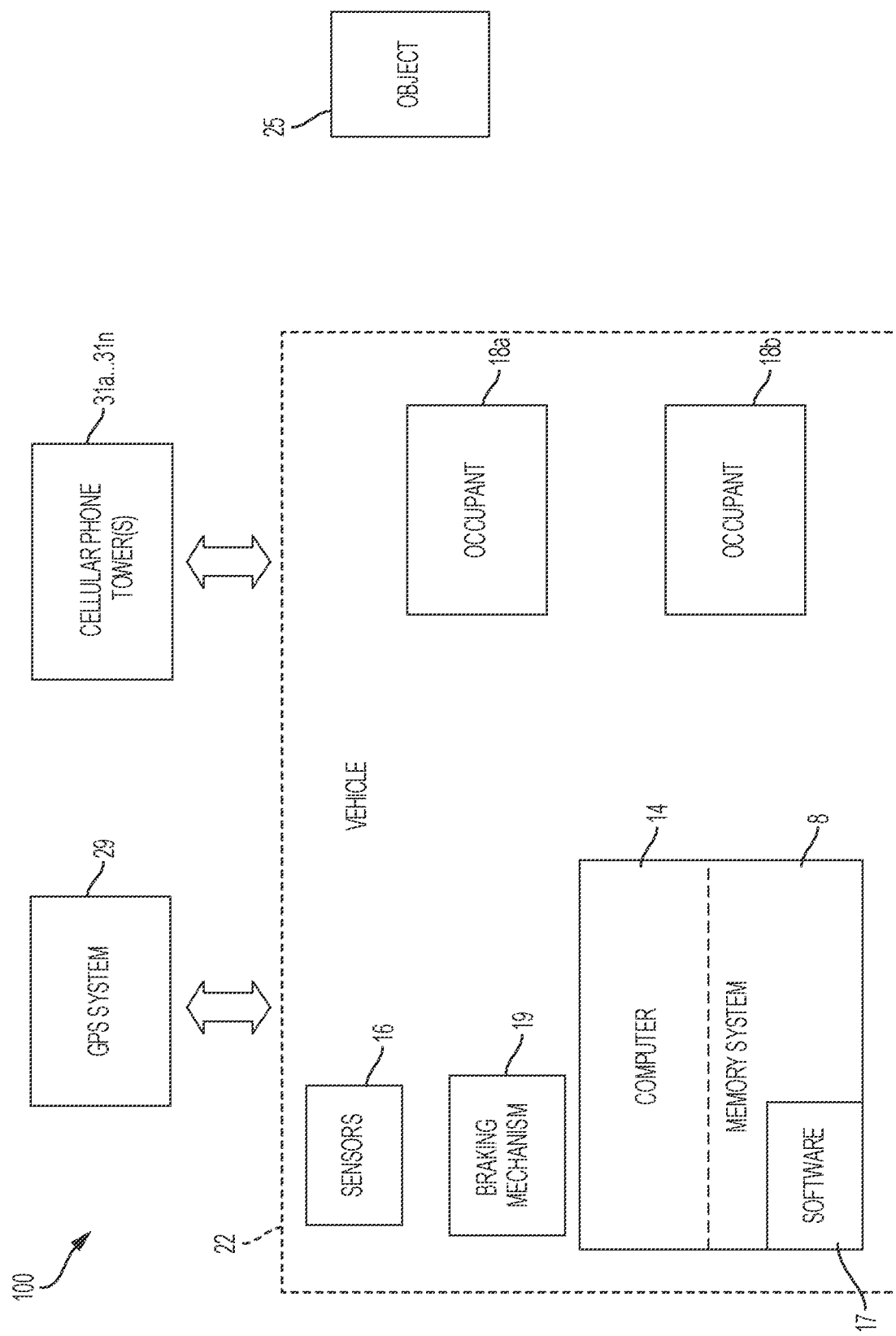

VEHICULAR ACCIDENT PREVENTION

FIELD

The present invention relates generally to a method for preventing vehicular accidents and in particular to a method and associated system for enabling a frictional based mechanism for activating a braking force associated with a vehicle with respect to a roadway.

BACKGROUND

Preventing collisions typically includes an inaccurate process with little flexibility. Collision avoidance systems may involve an unreliable process that may be time consuming and require a large amount of resources. Accordingly, there exists a need in the art to overcome at least some of the deficiencies and limitations described herein above.

SUMMARY

A first aspect of the invention provides a vehicular accident prevention improvement method comprising: continuously monitoring, by a processor of a hardware device within a vehicle, vehicular impact conditions associated with the vehicle in motion; detecting, by the processor based on results of the continuously monitoring, an imminent impact event associated with the vehicle in motion and an external object; scanning via a plurality of sensors of the vehicle, by the processor in response to the detecting, a surface of a roadway below the vehicle in motion; first determining, by the processor based on results of the scanning, that the surface is safe for deployment of a destructive friction based braking mechanism of the vehicle; deploying, by the processor in response to the first determining, the destructive friction based braking mechanism with respect to a first braking force threshold; and second determining, by the processor, if rate of speed decrease exceeds a specified speed decrease threshold.

A second aspect of the invention provides a computer program product, comprising a computer readable hardware storage device storing a computer readable program code, the computer readable program code comprising an algorithm that when executed by a computer processor of a hardware device within a vehicle implements a vehicular accident prevention improvement method, the method comprising: continuously monitoring, by the processor, vehicular impact conditions associated with the vehicle in motion; detecting, by the processor based on results of the continuously monitoring, an imminent impact event associated with the vehicle in motion and an external object; scanning via a plurality of sensors of the vehicle, by the processor in response to the detecting, a surface of a roadway below the vehicle in motion; first determining, by the processor based on results of the scanning, that the surface is safe for deployment of a destructive friction based braking mechanism of the vehicle; deploying, by the processor in response to the first determining, the destructive friction based braking mechanism with respect to a first braking force threshold; and second determining, by the processor, if rate of speed decrease exceeds a specified speed decrease threshold.

A third aspect of the invention provides a hardware device, within a vehicle, comprising a computer processor coupled to a computer-readable memory unit, the memory unit comprising instructions that when executed by the computer processor implements a vehicular accident prevention improvement method comprising: continuously monitoring, by the processor, vehicular impact conditions associated with the vehicle in motion; detecting, by the processor based on results of the continuously monitoring, an imminent impact event associated with the vehicle in motion and an external object; scanning via a plurality of sensors of the vehicle, by the processor in response to the detecting, a surface of a roadway below the vehicle in motion; first determining, by the processor based on results of the scanning, that the surface is safe for deployment of a destructive friction based braking mechanism of the vehicle; deploying, by the processor in response to the first determining, the destructive friction based braking mechanism with respect to a first braking force threshold; and second determining, by the processor, if rate of speed decrease exceeds a specified speed decrease threshold.

The present invention advantageously provides a simple method and associated system capable of preventing collisions during a driving process.

BRIEF DESCRIPTION OF THE DRAWINGS

FIG. 1 illustrates a system for enabling a frictional based mechanism for activating a braking force associated with a vehicle with respect to a roadway, in accordance with embodiments of the present invention.

DETAILED DESCRIPTION

Figure 2A:
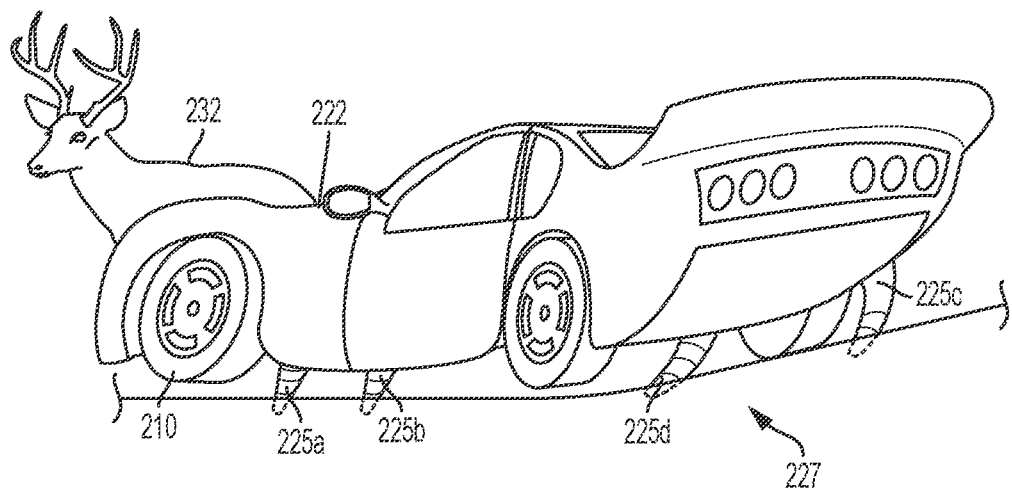
FIGS. 2A and 2B illustrate views of a vehicle for implementing the braking process enabled by the system of FIG. 1 for activating a braking force associated with a vehicle with respect to a roadway, in accordance with embodiments of the present invention.

FIG. 1 illustrates a system 100 for enabling for enabling a frictional based mechanism for activating a braking force associated with a vehicle with respect to a roadway, in accordance with embodiments of the present invention. System 100 is configured to activate a friction device to avoid high speed accidents with respect to autonomous vehicles. System 100 enables a vehicular accident prevention method as follows:

In response to a command signal, a vehicular controller (e.g., computer 14 in FIG. 1) detects when a braking force applied to a braking system (in response to detecting an object 25 in the roadway) of a moving (autonomous) vehicle equals or exceeds a threshold braking force. Additionally, the vehicular controller monitors (via sensors) a deployment surface (e.g., a roadway) below the moving vehicle to detect pre-determined characteristics for the roadway and non-penetrable objects in the roadway. Pre-determined characteristics for the roadway may include materials forming the roadway including, inter alia, asphalt, cement, etc. Alternatively, pre-determined characteristics for the roadway may include a portion of unobstructed roadway clear of any non-pavement objects. Non-penetrable objects may include, inter alia, drainage structures, manhole covers, etc. In response to the detection process, a destructive force braking mechanism is deployed.

System 100 is configured to monitor an autonomous vehicle moving at any speed to determine that a high speed accident is possible and unavoidable via using a standard process for maneuvering or applying standard brakes with respect to the autonomous vehicle. In response, the autonomous vehicle will automatically activate and deploy a destructive force friction braking mechanism to a roadway (i.e., comprising a pavement/snow/ice/dirt road surface) to stop the vehicle quickly. The destructive force friction braking mechanism may comprise a braking mechanism configured to actively lower (e.g., via mechanical or electromechanical means) physical metallic legs from the autonomous vehicle onto the roadway to penetrate a surface of the roadway to enable a maximum stopping power for avoiding a collision or significantly reducing a collision speed to reduce automobile damage and/or driver/passenger injuries. System 100 enables standard braking system deployment (i.e., via usage of brake pads and rotors) to stop or slow a vehicle under normal stopping conditions. Likewise, if a high speed unavoidable accident possibility is detected (via a determined braking activation threshold being exceeded), a mechanical or electromechanical system (e.g., a hydraulic powered system) forcibly activates metallic legs (e.g., as described, infra with respect to FIGS. 2A and 2B) under the vehicle to move in a downward direction (towards the roadway) and penetrate a surface of the roadway to achieve a maximum friction between the vehicle and the roadway. The metallic legs may be lowered symmetrically around the vehicle car to maximize stability (of the vehicle) during a stopping sequence process. The mechanical or electromechanical system enables enough force for the metallic legs to dig into the surface of the roadway including, inter alia, asphalt, concrete, snow, ice, dirt, etc. Additionally, the vehicle may analyze a depth of the deployed metallic legs (with respect to the roadway surface) and enable the metallic legs forced into the surface of the roadway at a greater depth if the vehicle is still moving after activation of the destructive force friction braking mechanism. The vehicle continuously monitors rate of motion of the vehicle during the braking process and the metallic legs are retracted back into an associated mechanism in the vehicle when the vehicle detects that the accident has been avoided. When the metallic legs are withdrawn from the roadway, system 100 is reset for future use. Additionally, vehicle 22 comprises sensors 16 for enabling split second decisions for executing a sequence of actions to minimize damage to a surface of the roadway during the aforementioned braking process.

System 100 of FIG. 1 includes a global positioning satellite (GPS) (or any type of movement detection system) system 29 and cellular phone towers 31a . . . 31n communicatively connected (e.g., via a network) to a vehicle 22. The vehicle 22 includes an onboard computer 14, occupants 18a . . . 18b, sensors 16, and a braking mechanism 19. Onboard computer 14 may include an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicle 22 (and braking mechanism 19) may comprise a specialized hardware device comprising specialized (non-generic) hardware and circuitry (i.e., specialized discrete non-generic analog, digital, and logic based circuitry) for executing a process described with respect to FIGS. 1-4. The specialized discrete non-generic analog, digital, and logic based circuitry may include proprietary specially designed components (e.g., a specialized integrated circuit, such as for example an Application Specific Integrated Circuit (ASIC) designed for only implementing an automated process for automatically enabling a vehicular accident prevention method. Vehicle 22 includes a memory system 8 and software 17 for executing a process for automatically enabling braking mechanism. Sensors may include, inter alia, GPS sensors, video recording devices, optical sensors, weight sensors, pressure sensors, motion sensors, etc. The memory system 8 may include a single memory system. Alternatively, the memory system may include a plurality of memory systems. Vehicle 22 may comprise an autonomously controlled vehicle that may include an intelligence algorithm that would enable vehicle 22 to know its location and self-determine a route to an audience member. Additionally, vehicle 22 may comprise a pre-programmed vehicle, etc. Alternatively, vehicle 22 may comprise any type of vehicle that includes a human operator located within the vehicle.

Vehicle 22 movement detection may include any type of detection movement methods (via usage of sensors 16) including, inter alia, global positioning satellite (GPS) tracking/movement detection methods (including triangulation motion detection methods), micro electro-mechanical system (MEMS) methods, Wi-Fi positioning methods, a cellular tower triangulation process, etc. Sensors 16 may include, inter alia, GPS sensors, motion detector sensors, infrared sensors, temperature sensors, pressure sensors, etc.

MEMS methods (located within cell phones) are enabled to detect acceleration movement (i.e., via an accelerometer and a gyroscope) used to trigger requests for positioning information. Therefore, MEMS enables a process for periodically requesting a current location and comparing the current location to prior location requests thereby determining movement, direction, and speed.

A Wi-Fi positioning method comprises a localization technique (used for positioning with wireless access points) is based on a process for measuring an intensity of a received signal (i.e., received signal strength in English RSS) and a process comprising finger printing. An accuracy of a Wi-Fi positioning method depends on a number of positions entered into a database.

A GPS tracking method (i.e., comprising a triangulation of geo synchronous satellites) comprises a location based service.

A cellular tower triangulation process uses a location area code (LAC) and a Cell ID of an associated cell tower currently connected to an associated cellular telephone to determine a position of the currently connected cellular telephone resulting in data usage from at least three cellular towers. The cellular tower triangulation process calculates a handset's location precisely. Each base station covers a specified geographical area.

System 100 executes an example process for enabling a vehicular accident prevention method as follows:

In response to an object in a roadway, a driver (e.g., occupant 18a) of a vehicle (e.g., vehicle 22) applies the standard brakes (via a brake pedal) of the vehicle. In response, the vehicle (i.e., a controller in the vehicle such as computer 14) determines an amount of pressure being applied to the brake pedal and compares the amount of pressure to a predetermined pressure threshold value. In the pressure exceeds the predetermined pressure threshold value, a surface of the roadway (under the vehicle) is scanned for potential non-roadway objects that may prevent a destructive force friction braking mechanism (e.g., braking mechanism 19) from performing its intended functions. If the surface of the roadway is determined to be safe for destructive force friction braking mechanism to be activated (based on the scanning process), destructive force friction braking mechanism lowers a set of metallic legs (from beneath the vehicle) into the surface of the roadway and the vehicle determines if a rate of speed decrease is able to adequately slow or stop the vehicle. Additionally, it is determined if a target speed for the vehicle has been achieved. If the rate of speed decrease and target speed has been achieved, the metallic legs are retracted back into the vehicle.

FIG. 2A illustrates a first view of a vehicle 222 for implementing the braking process enabled by system 100 of FIG. 1 for activating a braking force associated with a vehicle with respect to a roadway, in accordance with embodiments of the present invention. Vehicle 222 comprises metallic legs (or spikes) 225a . . . 225d each located adjacent to a respective tire 210. Metallic legs 225a . . . 225d are configured to be activated (via braking mechanism 19 of FIG. 1 comprising a mechanical or electro/mechanical means) such that they are forced (i.e., during a destructive force friction braking process) into surface of a roadway 227 to quickly stop vehicle 222 prior to a potential collision with an object. A mechanical means for implementing a destructive friction brake assembly may be enabled to use vehicle's 22 generated kinetic energy (e.g., via tire rotation and an associated hydraulic or gear based mechanism) to drive the metallic legs 225a . . . 225d into the surface of the roadway. For example, the vehicle's axle may rotate in a counter-clockwise direction and if the braking mechanism needs to be deployed, a gear is deployed by the vehicle 222 computer and associated mechanism. The deployed gear is moved and engaged such that the engaged gear transfers rotational energy of the gear directly as a downward force that deploys the metallic legs 225a . . . 225d and pushes them into the surface of the roadway 227. Additionally, a variable axial force limiter may be configured to limit a force to be transferred to the metallic legs. An amount of force transmitted is controlled by the computer and is increased if the computer determines that the metallic legs must be driven further down into the surface of the roadway to increase braking power. If vehicle 222 has achieved the necessary speed decrease with the active destructive brake mechanism engaged, then the computer may deploy a reverse slide process to engage the gear to lift up the metallic legs from the roadway and prevent any further road damage thereby retracting the destructive friction system back in place. Alternatively, an electro/mechanical means for implementing a destructive friction brake assembly may be used for activating the metallic legs to drive the metallic legs 225a . . . 225d into the surface of the roadway. For example, a motor, a solenoid, and/or a hydraulic mechanism may be used for activating the metallic legs to drive the metallic legs 225a . . . 225d into the surface of the roadway and to retract the metallic legs back into the vehicle 222. Coordination of the implementation steps is driven by the vehicle 222 main computer system. The computer system is configured to monitor a car speed, a speed reduction, and a distance to a point of impact to calculate all the parameters necessary to effectively slow down the vehicle 222 to avoid a roadway accident with an object 232.

Figure 2B:
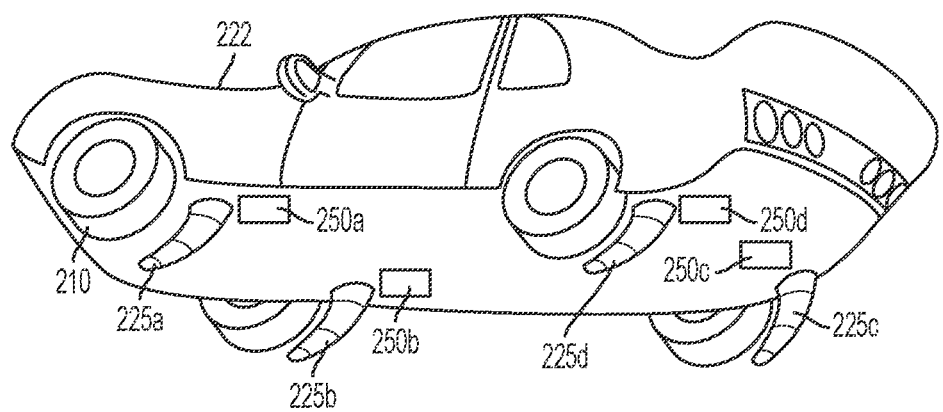

FIG. 2B illustrates a second view of vehicle 222 for implementing the braking process enabled by system 100 of FIG. 1 for activating a braking force associated with a vehicle with respect to a roadway, in accordance with embodiments of the present invention. The second view of FIG. 2B illustrates an additional view of the metallic legs 225a . . . 225d comprising a conical spike shape for penetrating a surface of the roadway. Additionally, FIG. 2B illustrates apparatuses 250a . . . 250d configured to electro-mechanically extend and retract the metallic legs 225a . . . 225d. Apparatuses 250a . . . 250d may each comprise a motor and associated circuitry apparatus, a solenoid and associated circuitry apparatus, a hydraulic or pneumatic apparatus, a kinetic energy based apparatus for engaging based on by movement of any portion of the vehicle (e.g., a tire or rotor, a drive train, etc.).

Figure 3:
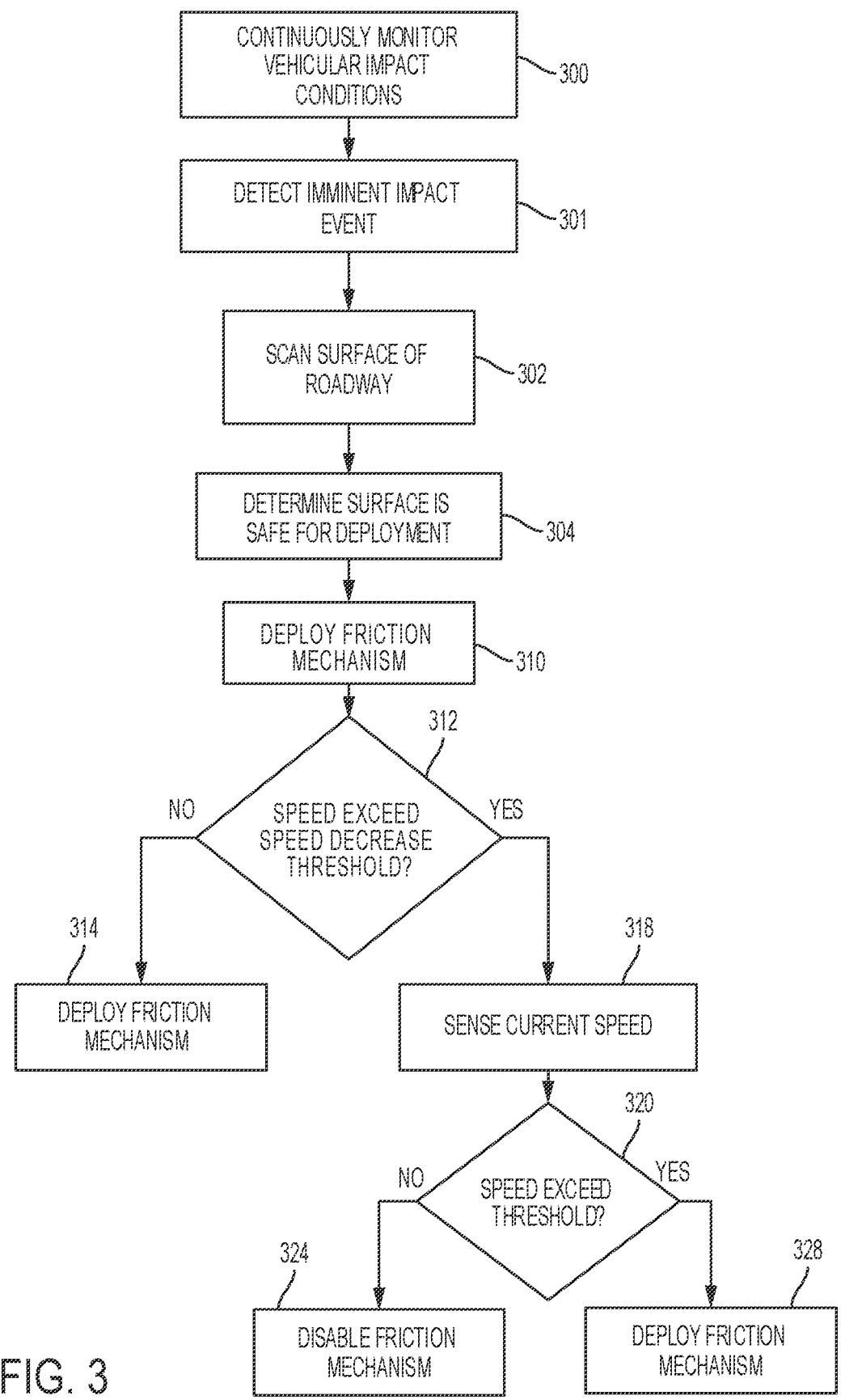
FIG. 3 illustrates a flowchart detailing a process enabled by the system of FIG. 1 for enabling a frictional based mechanism for activating a braking force associated with a vehicle with respect to a roadway, in accordance with embodiments of the present invention.

FIG. 3 illustrates a flowchart detailing a process enabled by system 100 of FIG. 1 for enabling a frictional based mechanism for activating a braking force associated with a vehicle with respect to a roadway, in accordance with embodiments of the present invention. Each of the steps in the algorithm of FIG. 3 may be enabled and executed in any order by a computer processor executing computer code. In step 300, vehicular impact conditions associated with a vehicle in motion are continuously monitored by a hardware device within a vehicle. In step 301, an imminent impact event associated with the vehicle in motion and an external object is detected based on results of the monitoring of step 300. Detecting the imminent impact event may include:

1. Automatically detecting, by said processor, an object within a pathway of the vehicle in motion,
2. Detecting an amount of force applied to a brake pedal of the vehicle, comparing the amount of force to a predetermined force threshold, and determining that the amount of force exceeds the predetermined force threshold.
3. Detecting an object within a pathway of the vehicle in motion.

In step 302, a surface of the roadway below the vehicle in motion is continuously scanned via a plurality of sensors of the vehicle. Results of the scanning process may indicate that the surface of the roadway below the vehicle in motion is clear from any non-penetrable roadway surfaces (e.g., a storm drain, a metallic plate, etc.). Additionally, results of the scanning process may indicate that the surface of the roadway below the vehicle in motion comprises a solid surface roadway such as, inter alia, an asphalt based roadway, a cement based roadway, etc.

In step 304, is determined (based on results of step 302) that the surface of the roadway is safe for deployment of a destructive friction based braking mechanism of the vehicle. In step 310, the destructive friction based braking mechanism is deployed with respect to a first braking force threshold. Deploying the destructive friction based braking mechanism may include, inter alia, activating elongated members within the vehicle (e.g., metallic legs 225a . . . 225d as illustrated in FIGS. 2A and 2B) vehicle such that portions of the elongated members are extended into the surface of a roadway. The first braking force threshold may comprise a length of the portions of the elongated members. The elongated members comprise metallic materials. The elongated members may be extended into the surface of a roadway via, inter alia, a motor apparatus, a solenoid apparatus, via usage of device using kinetic energy generated by movement of at least one tire or a drive train of the vehicle.

In step 312, it is determined if a rate of speed decrease exceeds a specified speed decrease threshold. If in step 312 it is it is determined that the rate of speed decrease does not exceed the specified speed decrease threshold then in step 314, the destructive friction based braking mechanism is deployed with respect to a second braking force threshold exceeding the first braking force threshold. If in step 312 it is it is determined that the rate of speed decrease exceeds the specified speed decrease threshold then in step 318, a current speed of the vehicle is detected. In step 320, it is determined if the current speed of the vehicle exceeds a specified speed threshold. If in step 320, it is determined that the current speed of the vehicle exceeds a specified speed threshold then in step 328, the destructive friction based braking mechanism is deployed with respect to a third braking force threshold exceeding the second braking force threshold. If in step 320, it is determined that the current speed of the vehicle does not exceed a specified speed threshold then in step 324, the destructive friction based braking mechanism is disabled.

Figure 4:
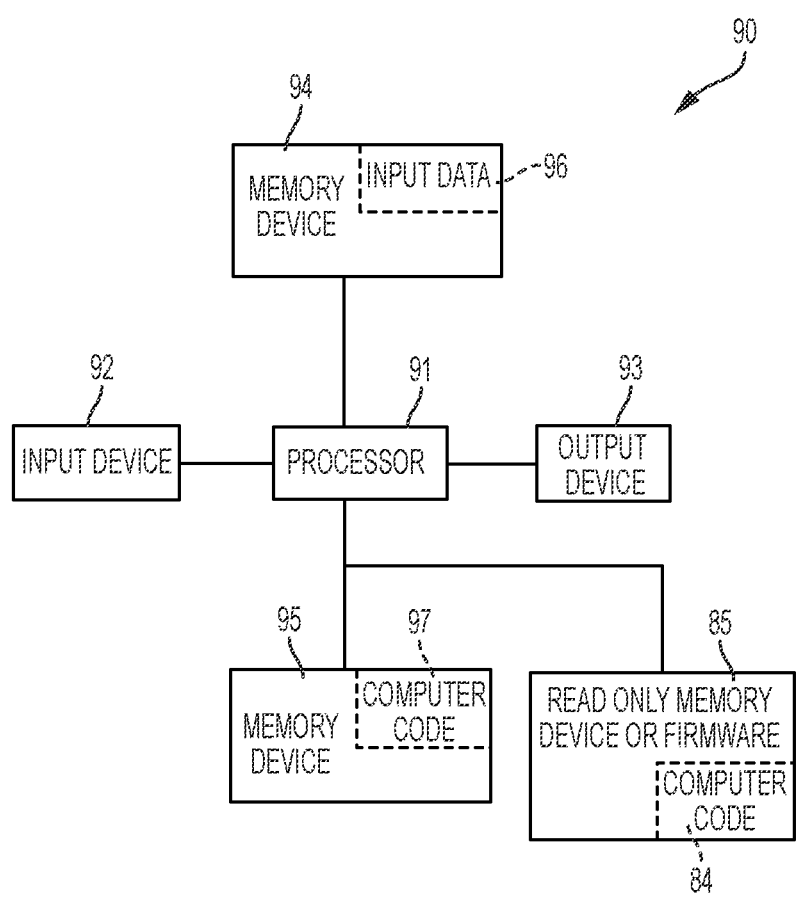
FIG. 4 illustrates a computer system for enabling a frictional based mechanism for activating a braking force associated with a vehicle with respect to a roadway, in accordance with embodiments of the present invention.

FIG. 4 illustrates a computer system 90 (e.g., computer 14 of FIG. 1) for enabling a frictional based mechanism for activating a braking force associated with a vehicle with respect to a roadway, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling a frictional based mechanism for activating a braking force associated with a vehicle with respect to a roadway. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIG. 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a frictional based mechanism for activating a braking force associated with a vehicle with respect to a roadway. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a frictional based mechanism for activating a braking force associated with a vehicle with respect to a roadway. In another embodiment, the invention provides a business method that performs the process steps of the invention on a subscription, advertising, and/or fee basis. That is, a service supplier, such as a Solution Integrator, could offer to enable a frictional based mechanism for activating a braking force associated with a vehicle with respect to a roadway. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicular accident prevention improvement method comprising:
    continuously monitoring, by a processor of a hardware device within a vehicle, vehicular impact conditions associated with said vehicle in motion;
    detecting, by the processor based on results of said continuously monitoring, an imminent impact event associated with said vehicle in motion and an external object;
    scanning via a plurality of sensors of said vehicle, by said processor in response to said detecting, a surface of a roadway below said vehicle in motion, wherein results of said scanning indicate that said surface of said roadway below said vehicle in motion comprises a solid surface roadway selected from the group consisting of an asphalt based roadway and a cement based roadway;
    first determining, by said processor based on said results of said scanning, that said surface is safe for deployment of a destructive friction based braking mechanism of said vehicle;
    deploying, by said processor in response to said first determining, said destructive friction based braking mechanism with respect to a first braking force threshold; and
    second determining, by said processor, if a rate of speed decrease exceeds a specified speed decrease threshold.

2. The method of claim 1, wherein results of said second determining indicate that said rate of speed decrease does not exceed said specified speed decrease threshold, and wherein said method further comprises:

deploying, by said processor in response to said results of said second determining, said destructive friction based braking mechanism with respect to a second braking force threshold exceeding said first braking force threshold.

3. The method of claim 1, wherein results of said second determining indicate that said rate of speed decrease exceeds said specified speed decrease threshold, and wherein said method further comprises:

sensing, by said processor via a speed sensor of said vehicle, a current speed of said vehicle; and third determining, by said processor, if said current speed of said vehicle exceeds a specified speed threshold.

4. The method of claim 3, wherein results of said third determining indicate that said current speed of said vehicle exceeds said specified speed threshold, and wherein said method further comprises:

deploying, by said processor in response to said results of said third determining, said destructive friction based braking mechanism with respect to a third braking force threshold exceeding said second braking force threshold.

5. The method of claim 3, wherein results of said third determining indicate that said current speed of said vehicle does not exceed said specified speed threshold, and wherein said method further comprises:

disabling, by said processor in response to said results of said third determining, said destructive friction based braking mechanism.

6. The method of claim 1, wherein said detecting said imminent impact event further comprises:

automatically detecting, by said processor, an object within a pathway of said vehicle in motion.

7. The method of claim 1, wherein said detecting said imminent impact event comprises:

detecting, by said processor, an amount of force applied to a brake pedal of said vehicle;

comparing, by said processor, said amount of force to a predetermined force threshold; and determining, by said processor, that said amount of force exceeds said predetermined force threshold.

8. The method of claim 7, wherein said detecting said imminent impact event further comprises:

detecting, by said processor, an object within a pathway of said vehicle in motion.

9. The method of claim 1, wherein said deploying said destructive friction based braking mechanism comprises activating elongated members of said vehicle such that portions of said elongated members are extended into said surface of a roadway, and wherein said first braking force threshold comprises a length of said portions.

10. The method of claim 9, wherein said elongated members comprise metal members.

11. The method of claim 9, wherein said elongated members are extended into said surface of a roadway via a motor apparatus.

12. The method of claim 9, wherein said elongated members are extended into said surface of a roadway via a solenoid apparatus.

13. The method of claim 9, wherein said elongated members are extended into said surface of a roadway via usage of device using kinetic energy generated by movement of at least one tire of said vehicle.

14. The method of claim 1, wherein said results of said scanning indicate that said surface of said roadway below said vehicle in motion is clear from any non-penetrable roadway surfaces.

15. The method of claim 1, further comprising:

providing at least one support service for at least one of creating, integrating, hosting, maintaining, and deploying computer-readable code in the computing system, said code being executed by the computer processor to implement: said continuously monitoring, said detecting, said scanning, said first determining, said deploying, and said second determining.

16. A computer program product, comprising a computer readable hardware storage device storing a computer readable program code, said computer readable program code comprising an algorithm that when executed by a computer processor of a hardware device within a vehicle implements a vehicular accident prevention improvement method, said method comprising:

continuously monitoring, by said processor, vehicular impact conditions associated with said vehicle in motion;

detecting, by said processor based on results of said continuously monitoring, an imminent impact event associated with said vehicle in motion and an external object;

scanning via a plurality of sensors of said vehicle, by said processor in response to said detecting, a surface of a roadway below said vehicle in motion, wherein results of said scanning indicate that said surface of said roadway below said vehicle in motion comprises a solid surface roadway selected from the group consisting of an asphalt based roadway and a cement based roadway;

first determining, by said processor based on said results of said scanning, that said surface is safe for deployment of a destructive friction based braking mechanism of said vehicle;

deploying, by said processor in response to said first determining, said destructive friction based braking mechanism with respect to a first braking force threshold; and second determining, by said processor, if a rate of speed decrease exceeds a specified speed decrease threshold.

17. The computer program product of claim 16, wherein results of said second determining indicate that said rate of speed decrease does not exceed said specified speed decrease threshold, and wherein said method further comprises:

deploying, by said processor in response to said results of said second determining, said destructive friction based braking mechanism with respect to a second braking force threshold exceeding said first braking force threshold.

18. A hardware device, within a vehicle, comprising a computer processor coupled to a computer-readable memory unit, said memory unit comprising instructions that when executed by the computer processor implements a vehicular accident prevention improvement method comprising:

continuously monitoring, by said processor, vehicular impact conditions associated with said vehicle in motion;

detecting, by said processor based on results of said continuously monitoring, an imminent impact event associated with said vehicle in motion and an external object;

scanning via a plurality of sensors of said vehicle, by said processor in response to said detecting, a surface of a roadway below said vehicle in motion, wherein results of said scanning indicate that said surface of said roadway below said vehicle in motion comprises a solid surface roadway selected from the group consisting of an asphalt based roadway and a cement based roadway;

first determining, by said processor based on said results of said scanning, that said surface is safe for deployment of a destructive friction based braking mechanism of said vehicle;

deploying, by said processor in response to said first determining, said destructive friction based braking mechanism with respect to a first braking force threshold; and second determining, by said processor, if a rate of speed decrease exceeds a specified speed decrease threshold.

19. The hardware device of claim 18, wherein results of said second determining indicate that said rate of speed decrease does not exceed said specified speed decrease threshold, and wherein said method further comprises:

deploying, by said processor in response to said results of said second determining, said destructive friction based braking mechanism with respect to a second braking force threshold exceeding said first braking force threshold.

\* \* \* \* \*